(12) United States Patent
Koga et al.

(10) Patent No.: US 9,111,101 B2
(45) Date of Patent: Aug. 18, 2015

(54) INFORMATION PROCESSING APPARATUS CAPABLE OF ENABLING SELECTION OF USER DATA ERASE METHOD, DATA PROCESSING METHOD, AND STORAGE MEDIUM

(75) Inventors: Kazuhiro Koga, Yokohama (JP); Jun Hamaguchi, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 983 days.

(21) Appl. No.: 13/069,911

(22) Filed: Mar. 23, 2011

(65) Prior Publication Data

US 2011/0238901 A1 Sep. 29, 2011

(30) Foreign Application Priority Data

Mar. 25, 2010 (JP) ................. 2010-069414

(51) Int. Cl.
*G06F 12/02* (2006.01)
*G06F 21/60* (2013.01)

(52) U.S. Cl.
CPC ...... *G06F 21/602* (2013.01); *G06F 2221/2143* (2013.01)

(58) Field of Classification Search
CPC ............... G06F 3/0652; G06F 3/0679; G06F 2212/7205
USPC ......................... 711/103, 154, 166
See application file for complete search history.

(56) References Cited

U.S. PATENT DOCUMENTS

| | | | | |
|---|---|---|---|---|
| 6,731,447 B2* | 5/2004 | Bunker et al. | .................. | 360/60 |
| 7,899,974 B2* | 3/2011 | Park | .............. | 711/103 |
| 7,925,622 B2* | 4/2011 | Chapman | .................... | 707/609 |
| 8,130,554 B1* | 3/2012 | Linnell | .................... | 365/185.28 |
| 8,250,380 B2* | 8/2012 | Guyot et al. | .................. | 713/193 |
| 8,359,447 B1* | 1/2013 | Trimberger | .................... | 711/170 |
| 8,359,660 B2* | 1/2013 | Lang | .............................. | 726/34 |
| 8,370,644 B2* | 2/2013 | Handschuh et al. | .......... | 713/193 |
| 8,447,989 B2* | 5/2013 | Barrus et al. | .................. | 713/181 |
| 2004/0114265 A1* | 6/2004 | Talbert | ............................ | 360/60 |
| 2006/0195650 A1* | 8/2006 | Su et al. | ........................ | 711/103 |
| 2012/0023303 A1* | 1/2012 | Russo et al. | .................. | 711/166 |

FOREIGN PATENT DOCUMENTS

| | | |
|---|---|---|
| CN | 101344907 A | 1/2009 |
| CN | 101615427 A | 12/2009 |
| JP | 2004-153517 A | 5/2004 |

OTHER PUBLICATIONS

Joukov, Nikolai, and Erez Zadok. "Adding secure deletion to your favorite file system." Security in Storage Workshop, 2005. SISW'05. Third IEEE International. IEEE, 2005.*
Silicon Storage Technology, Inc., ATA-Disk Module, 2001, http://www.metatech.com.hk/datasheet/sst/mass_storage_pdf/519-58SM-LM8-192-01.000-DS.pdf.*
CN Office Action issued Mar. 28, 2013 for corres. CN 201110081109.9.

* cited by examiner

*Primary Examiner* — Tuan Thai
(74) *Attorney, Agent, or Firm* — Rossi, Kimms & McDowell LLP

(57) ABSTRACT

A mechanism which makes it possible to automatically and appropriately select an erase method of erasing user data in a shorter time such that the user data can by no means be reproduced, according to the type of a connected nonvolatile storage device. An information processing apparatus determines an erase method of erasing an erase area of the nonvolatile storage device according to a management table generated based on attribute information acquired from the nonvolatile storage device. Then, the image forming apparatus erases information stored in the erase area according to the determined erase method.

6 Claims, 17 Drawing Sheets

FIG.3

| No | CLEAR-Flag | CLEAR-Logic | Label | Partition #Major | #Minor | Size | Use |
|---|---|---|---|---|---|---|---|
| 1 | 0 | 0 | flSYSTEM | 3 | 1 | 256 | PROGRAMS |
| 2 | 0 | 0 | hdSYSTEM | 3 | 65 | 8192 | EXTENSION PROGRAMS |
| 3 | 1 | 0 | flAPL | 3 | 2 | 437 | EXTENSION APPLICATIONS |
| 4 | 1 | 0 | hdAPL | 3 | 66 | 5120 | EXTENSION APPLICATIONS |
| 5 | 1 | 2 | flTMP | 3 | 3 | 172 | TEMPORARY APPLICATIONS |
| 6 | 1 | 1 | hdSPOOL | 3 | 67 | 2048 | PRINT QUEUES |
| 7 | 1 | 2 | flIMG | 3 | 4 | 1024 | IMAGES |
| 8 | 1 | 1 | hdIMG | 3 | 68 | 20681 | EXTENSION IMAGES |
| 9 | 1 | 2 | flBOX | 3 | 5 | 1 | USER BOXES |
| 10 | 1 | 1 | hdBOX | 3 | 69 | 10240 | EXTENSION USER BOXES |
| 11 | 1 | 2 | flLOG | 3 | 6 | 27 | LOGS |
| 12 | 1 | 1 | hdLOG | 3 | 70 | 3428 | EXTENSION LOGS |

| Storage No. 701 | MANUFACTURER NAME 702 | MODEL NUMBER 703 | SUPPORT COMMAND 704 |
|---|---|---|---|
| 1 | GHI-MEM | GHISD080H | Sector-Erase Command Support |
| 2 | - | - | - |

FIG.8

| ID | MANUFACTURER NAME | MODEL NUMBER | MEDIUM TYPE | WEAR LEVELING AREA INFORMATION |
|---|---|---|---|---|
| 1 | ABC-STR | ABC80-SS80 | Magnetic HardDisk | – |
| 2 | DEF-DISK | DEFSS-SLSL | Semiconductor Disk | All |
| 3 | XYZ-SEMI | XYZ-SD80 | Semiconductor Disk | – |
| 4 | GHI-MEN | GHISD080H | Semiconductor Disk | 0x01000000 ~ 0x07FFFFFF |
| 5 | JKL-DRIVE | JKLDR-0080SD | Semiconductor Disk | All |

| No. 1001 | Label 1002 | Storage No. 1003 | Start Block Address 1004 | End Block Address 1005 | Size(Blocks) 1006 | Exist User Data 1007 |
|---|---|---|---|---|---|---|
| 1 | /BOOT | 1 | 0x0000B000 | 0x0060AFFF | 0x0600000 | No |
| 2 | /APL | 1 | 0x0060B000 | 0x0160AFFF | 0x1000000 | No |
| 3 | /SPOOL | 1 | 0x0160B000 | 0x0260AFFF | 0x1000000 | Yes |
| 4 | /IMG | 1 | 0x0260B000 | 0x0460AFFF | 0x2000000 | Yes |
| 5 | /BOX | 1 | 0x0460B000 | 0x0660AFFF | 0x2000000 | Yes |
| 6 | /LOG | 1 | 0x0660B000 | 0x06A0AFFF | 0x0400000 | Yes |
| ... | ... | ... | ... | ... | ... | ... |

| Storage No. | MANUFACTURER NAME | MODEL NUMBER | SUPPORT COMMAND |
|---|---|---|---|
| 1 | GHI-MEM | GHISD80H | Secure-UnitErase Command Support |
| 2 | - | - | - |

| ID | MANUFACTURER NAME | MODEL NUMBER | MEDIUM TYPE | WEAR LEVELING AREA INFORMATION | WEAR LEVELING PRE-REPLACEMENT BLOCK ERASE | PACKAGE TYPE |
|---|---|---|---|---|---|---|
| 1 | ABC-STR | ABC80-SS80 | Magnetic HardDisk | - | - | - |
| 2 | DEF-DISK | DEFSS-SLSL | Semiconductor Disk | All | Yes | Separate |
| 3 | XYZ-SEMI | XYZ-SD80 | Semiconductor Disk | - | - | Separate |
| 4 | GHI-MEM | GHISD080H | Semiconductor Disk | 0x01000000 ~ 0x07FFFFFF | Yes | Separate |
| 5 | JKL-DRIVE | JKLDR-0080SD | Semiconductor Disk | All | No | OneChip |
| ... | ... | ... | ... | ... | ... | ... |

1400

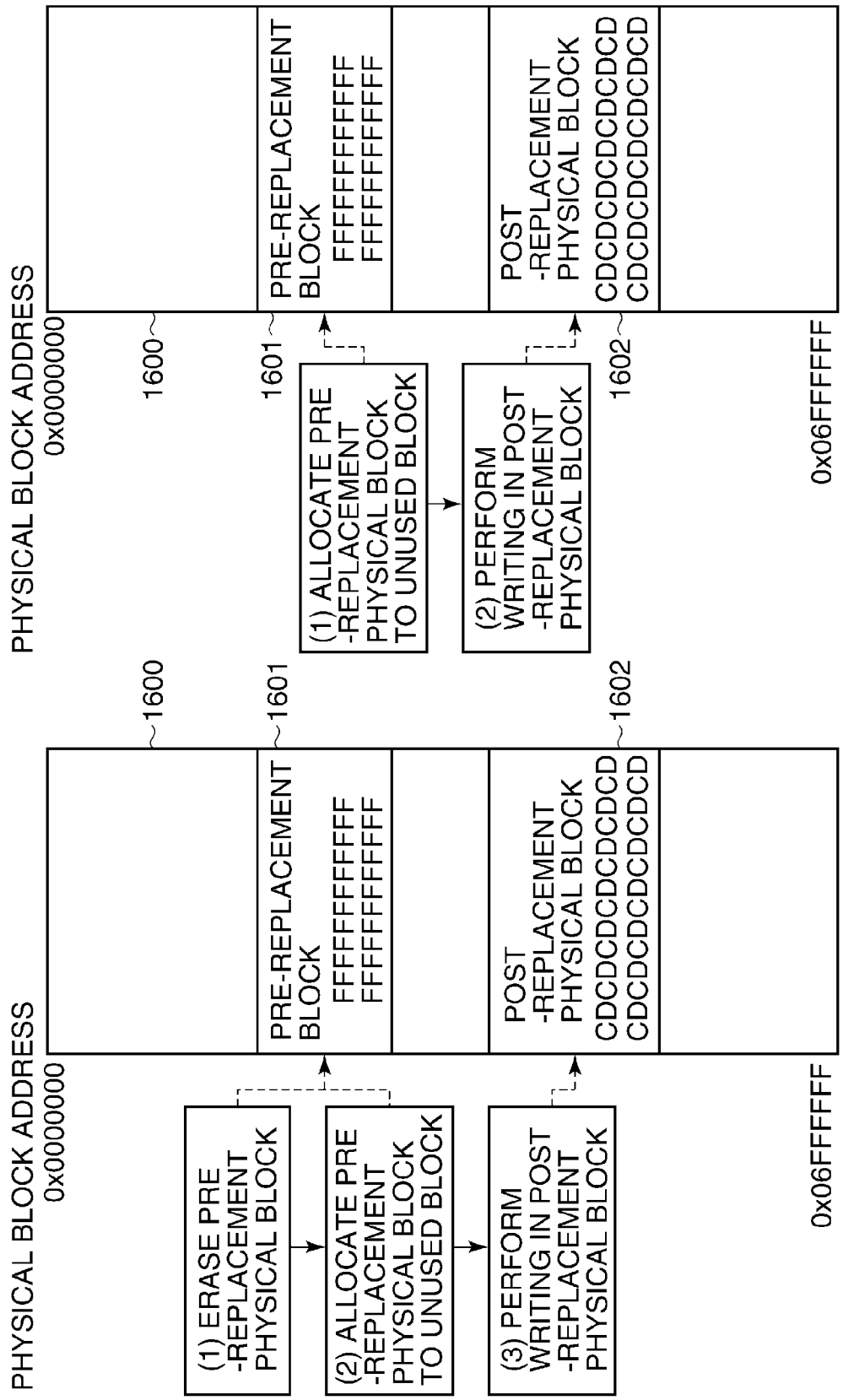

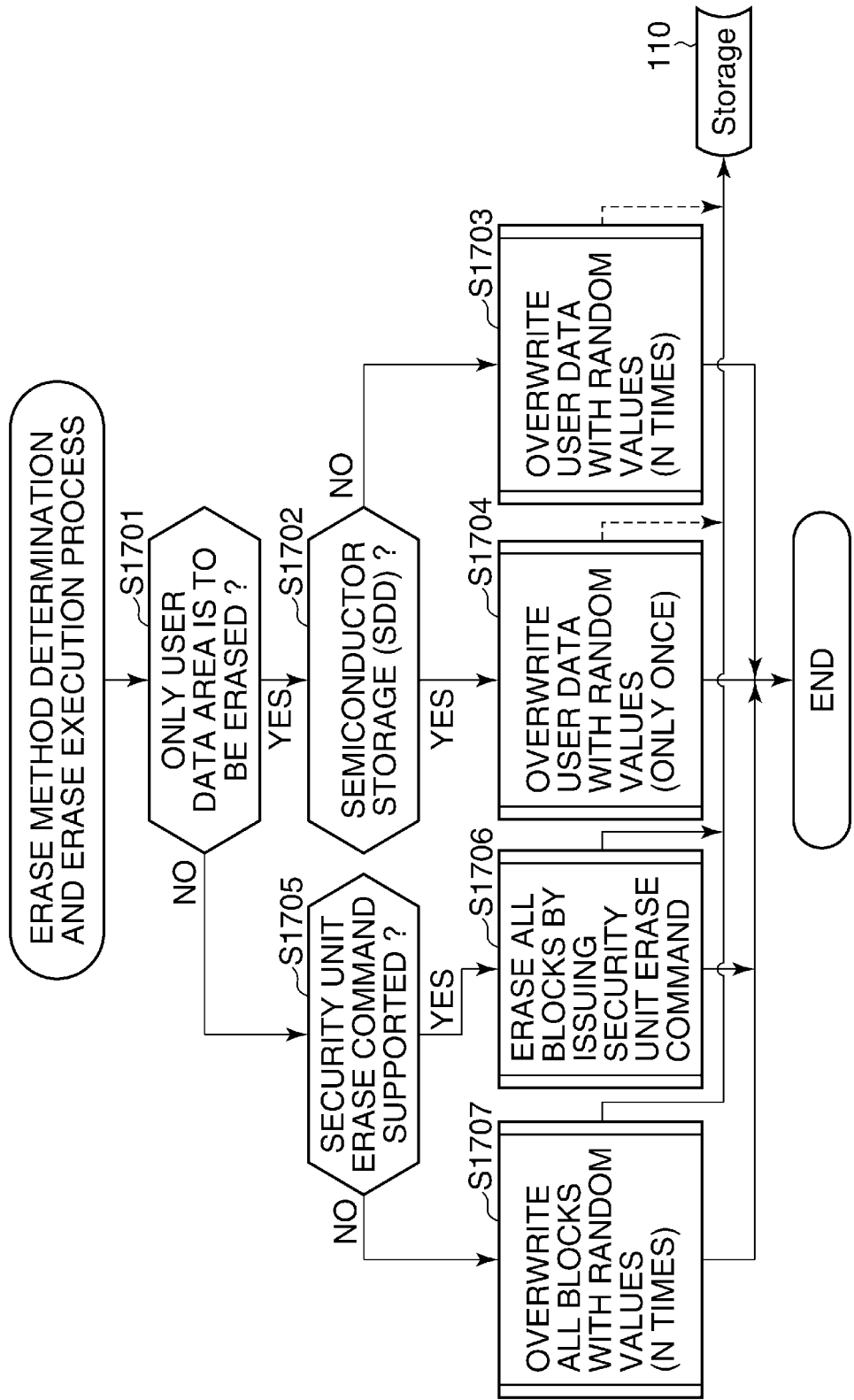

INFORMATION PROCESSING APPARATUS CAPABLE OF ENABLING SELECTION OF USER DATA ERASE METHOD, DATA PROCESSING METHOD, AND STORAGE MEDIUM

BACKGROUND OF THE INVENTION

1. Field of the Invention

The present invention relates to an information processing apparatus to which nonvolatile storage devices of different types can be connected, and a data processing method executed by the information processing apparatus.

2. Description of the Related Art

In recent years, there has been proposed an apparatus equipped with a function of erasing user data stored in a disk, as a security function. For example, in an image forming apparatus, the function corresponds to a function of erasing original image data, an address book stored or the like by a user, in a batch. Further, recently, an increasing number of apparatuses have come to use a semiconductor storage device called an SSD (solid-state drive) using a flash memory, in place of a magnetic HDD.

In the case of performing full erase on a magnetic HDD which performs magnetic recording, a method is generally used which overwrites an area storing user data with random values a plurality of times so as to reliably erase magnetic traces. For example, an invention disclosed in Japanese Patent Laid-Open Publication No. 2004-153517 has realized an apparatus in which the number of times of erasure can be set according to a desired security level, and erasure is executed according to the set number of times of execution of erasure.

When a semiconductor storage device is employed, information is stored in an on-chip semiconductor, and hence differently from a magnetic HDD from which values on a magnetic substance of a disk can be read by decomposing the same, it is very difficult to read values stored thereon by decomposing the semiconductor storage device.

Recently, however, there is used a semiconductor storage device which performs distributed writing called wear leveling so as to prolong the service life of a flash memory in the storage device. The semiconductor storage device which performs wear leveling executes writing while replacing one block with another so as to preferentially use blocks used fewer times for writing than other blocks. For this reason, information might be left in blocks used before replacement, depending on a block replacement control method for wear leveling.

According to the invention disclosed in Japanese Patent Laid-Open Publication No. 2004-153517, when the security level is set high, erasure is performed a plurality of times irrespective of the type of a disk installed in the device. Therefore, the erasure requires a long time period. On the other hand, in the semiconductor storage device, even if overwriting is simply performed a plurality of times, user data might be left in blocks on the flash memory, depending on the above-mentioned block replacement control method for wear leveling.

SUMMARY OF THE INVENTION

The present invention provides an information processing apparatus and method which make it possible to automatically and appropriately select an erase method of erasing user data in a shorter time period such that the user data can by no means be reproduced, according to the type of a connected nonvolatile storage device, and anon-transitory computer-readable storage medium storing a computer-executable program for causing a computer to execute the information processing method.

In a first aspect of the present invention, there is provided an information processing apparatus to which different types of nonvolatile storage devices can be connected, comprising a determination unit configured to determine an erase method of erasing an erase area of the nonvolatile storage device which the information processing apparatus is instructed to erase, according to attribute information acquired from the nonvolatile storage device, and an erasure unit configured to erase information stored in the erase area according to the erase method determined by the determination unit.

In a second aspect of the present invention, there is provided a data processing method executed by an information processing apparatus to which different types of nonvolatile storage devices can be connected, comprising determining an erase method of erasing an erase area of the nonvolatile storage device which the information processing apparatus is instructed to erase, according to attribute information acquired from the nonvolatile storage device, and erasing information stored in the erase area according to the determined erase method.

In a third aspect of the present invention, there is provided a non-transitory computer-readable storage medium storing a computer-executable program for causing a computer to execute a data processing method executed by an information processing apparatus to which different types of nonvolatile storage devices can be connected, wherein the data processing method comprises determining an erase method of erasing an erase area of the nonvolatile storage device which the information processing apparatus is instructed to erase, according to attribute information acquired from the nonvolatile storage device, and erasing information stored in the erase area according to the determined erase method.

According to the present invention, it is possible to automatically and appropriately select an erase method of erasing user data in a shorter time such that the user data can by no means be reproduced, according to the type of a connected nonvolatile storage device.

The features and advantages of the invention will become more apparent from the following detailed description taken in conjunction with the accompanying drawings.

BRIEF DESCRIPTION OF THE DRAWINGS

FIG. 3 is a diagram illustrating a storage area configuration information table associated with the nonvolatile storage devices shown in FIG. 2.

FIG. 7 is a diagram useful in explaining component elements of a storage information table stored in the image forming apparatus.

FIG. 8 is a diagram useful in explaining component elements of a storage database stored in the image forming apparatus.

FIG. 10 is a diagram illustrating a storage area configuration information table associated with the nonvolatile storage devices appearing in FIG. 1.

FIG. 13 is a diagram useful in explaining component elements of a storage information table stored in the image forming apparatus.

FIG. 14 is a diagram useful in explaining component elements of a storage database stored in the image forming apparatus.

FIGS. 16A and 16B are diagrams useful in explaining two types of wear leveling control in the image forming apparatus.

FIG. 17 is a flowchart of an erase method determination and erase execution process executed by the image forming apparatus.

DETAILED DESCRIPTION OF THE EMBODIMENTS

The present invention will now be described in detail below with reference to the accompanying drawings showing embodiments thereof.

Figure 1:
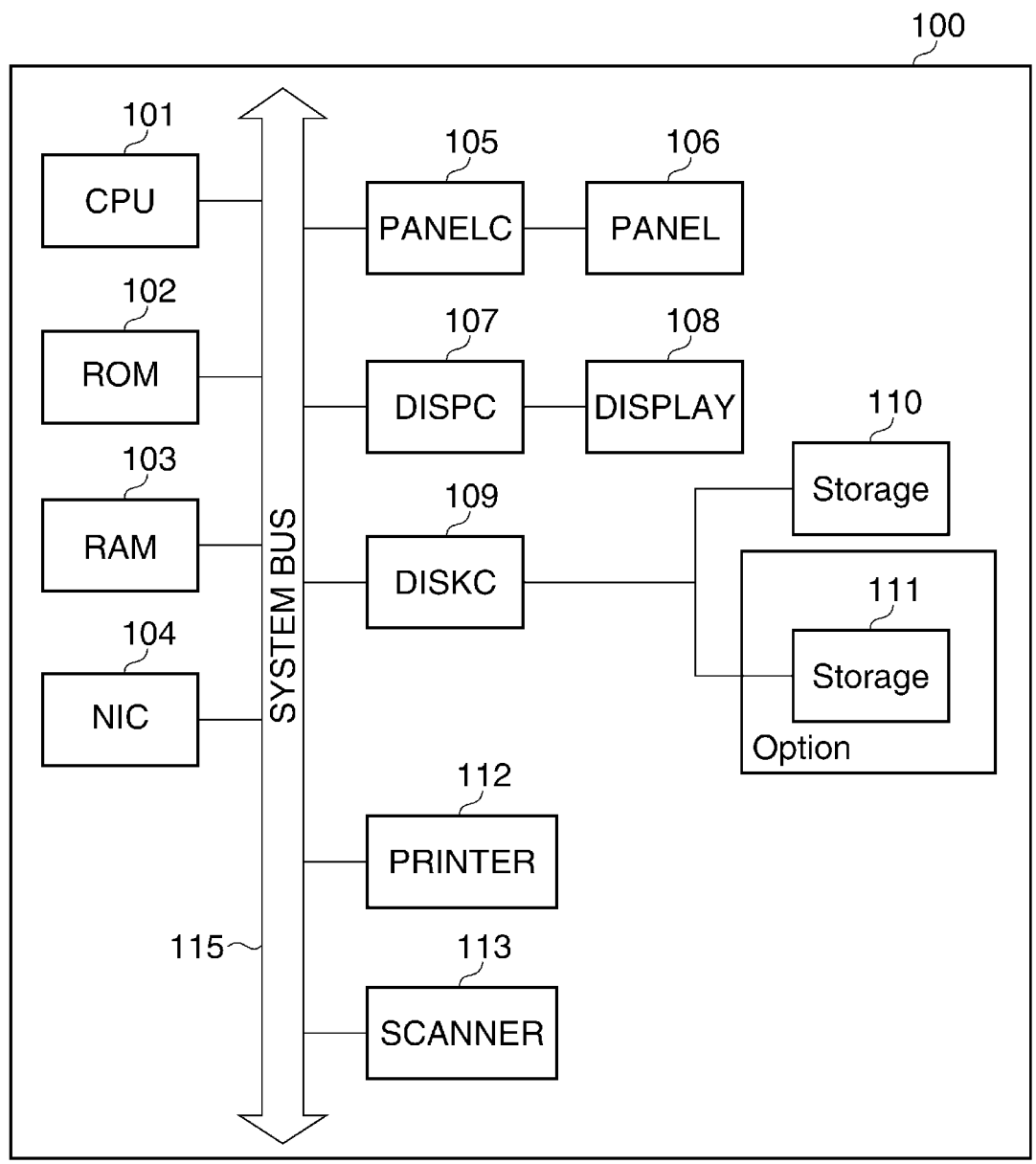
FIG. 1 is a block diagram of an image forming apparatus as an information processing apparatus according to a first embodiment of the present invention.

FIG. 1 is a block diagram of an image forming apparatus as an information processing apparatus according to a first embodiment of the present invention. Although in the present embodiment, the information processing apparatus is described by taking the image forming apparatus as an example, the information processing apparatus may be another type of apparatus than the image forming apparatus.

Referring to FIG. 1, reference numeral 100 denotes the image forming apparatus. The image forming apparatus 100 comprises a CPU 101 that executes software stored in a ROM 102 or a nonvolatile storage device (hereinafter also referred to as "the storage", and represented as "Storage" in FIG. 1) 110, such as a hard disk. In the present embodiment, it is possible to install any of a semiconductor storage device and a magnetic disk device, as the nonvolatile storage device. Further, it is possible to combine the two types of storage devices depending on the system configuration. It should be noted that the nonvolatile storage device is used as program areas and areas for storing user information and the like, and the CPU 101 manages the areas using a management table.

The CPU 101 performs centralized overall control of all devices connected to a system bus 115. The nonvolatile storage device can be realized by connecting a plurality of nonvolatile storage devices to each other, so that it is possible to optionally use a nonvolatile storage device (hereinafter also referred to as "the storage" and represented as "Storage" in FIG. 1) 111 as an extension device. In this case, the nonvolatile storage devices may be of different types or of the same type.

In each of the nonvolatile storage devices 110 and 111, control for reading and writing is performed by a disk controller (denoted as DISKC in FIG. 1) 109 under the control of the CPU 101. More specifically, in response to an erase instruction from the CPU 101, the disk controller 109 erases information stored in the storage 110 or 111 and so forth connected thereto, in accordance with control procedures described hereinafter. The nonvolatile storage device 110 is also used as a temporary storage area for image data.

Reference numeral 103 denotes a RAM. The RAM 103 serves as a main memory, a work area and the like for the CPU 101. Reference numeral 105 denotes an external input controller (denoted as PANELC in FIG. 1). The external input controller 105 controls input of instructions e.g. via a display section (denoted as PANEL in FIG. 1) 106 comprising various buttons and a touch panel provided in the image forming apparatus. Reference numeral 107 denotes a display controller (DISPC in FIG. 1). The display controller 107 controls display executed by a display section (DISPLAY in FIG. 1) 108 including a liquid crystal display.

Reference numeral 104 denotes a network interface card (NIC in FIG. 1). The network interface card 104 exchanges data bidirectionally with other network devices, a file server, and so forth. Reference numeral 112 denotes a printer section (PRINTER in FIG. 1). The printer section 112 performs printing on a sheet e.g. by electrophotography or an inkjet method. Reference numeral 113 denotes an image reading section (SCANNER in FIG. 1). The image reading section 113 reads an image printed on a sheet. In general, the image reading section 113 has an automatic document feeder (not shown) optionally mounted thereon, and is capable of automatically reading a plurality of sheets.

Figure 2:
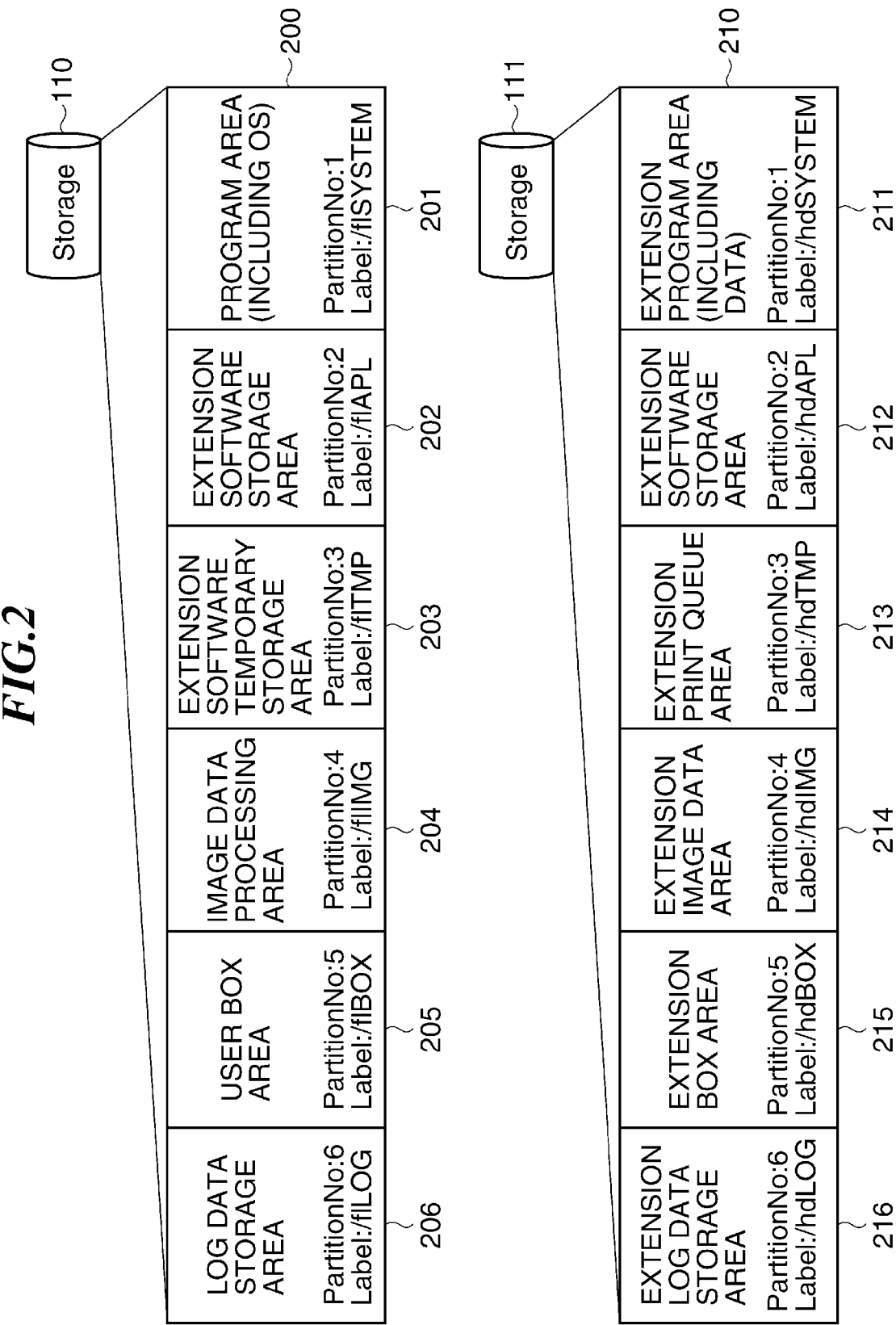
FIG. 2 is a diagram illustrating a storage area configuration of nonvolatile storage devices.

FIG. 2 is a diagram illustrating the storage area configuration of each of the nonvolatile storage device 110 and the nonvolatile storage device 111 mounted in the image forming apparatus according to the first embodiment. FIG. 2 shows an example in which all areas in the nonvolatile storage devices 110 and 111 are made available, but it is assumed that when the nonvolatile storage device 111 is provided, some areas in the nonvolatile storage device 110 may not be used.

An entire storage area 200 of the storage 110 is divided into several areas (partitions), and the areas are used for respective different purposes. For example, the entire storage area 200 is divided into a program area 201, an extension software storage area 202, an extension software temporary storage area 203, an image data processing area 204, a user box area 205, and a log data storage area 206.

Similarly, an entire storage area 210 of the storage 111 is divided into several areas (partitions), and the areas are used for respective different purposes. For example, the entire storage area 210 is divided into an extension program area 211, an extension software storage area 212, an extension print queue area 213, an extension image data area 214, an extension box area 215, and an extension log data storage area 216.

The program area 201 and the extension program area 211 store programs including an OS and resource data, such as dictionaries and languages. The extension software storage area 202 and the extension software storage area 212 store software for realizing additional functions. Of all the areas, two types of areas, i.e. program-related areas and software storage-related areas are used by the system, and hence user data is by no means stored in these areas.

The extension software temporary storage area 203 is used for temporary file generation during execution of extension software. The extension print queue area 213 is a spool area for temporary accumulation of print data received from the network interface card (NIC) 104. The image data processing area 204 and the extension image data area 214 temporarily store results of image processing of data to be printed.

The user box area 205 and the extension box area 215 store image data (image information) and the like stored by a user. The log data storage area 206 and the extension log data storage area 216 each secured as a log information storage area are used to log the operating conditions of programs and the progress of each job.

Each of the nonvolatile storage device 110 and the nonvolatile storage device 111 is thus divided into the above-described areas which are used on a purpose-by-purpose basis.

Data created by the user can be stored in the following eight areas: the extension software temporary storage area 203, the extension print queue area 213, the image data processing area 204, the extension image data area 214, the user box area 205, the extension box area 215, the log data storage area 206, and the extension log data storage area 216. In the case of erasing or updating a file stored in any one of these storage areas, it is required to securely erase data portions of the file.

FIG. 3 is a diagram illustrating a storage area configuration information table (partition management table) associated with the storages 110 and 111 shown in FIG. 2. Referring to FIG. 3, reference numeral 300 denotes the storage area configuration information table in the present example of the first embodiment, which comprises information items described below. It should be noted that the storage area configuration information table 300 is stored and managed in the storage 110.

In the present example, the storage area configuration information table 300 comprises information items 301 to 308: "No.", "CLEAR-Flag", "CLEAR-Logic", "Label", "Major No.", "Minor No.", "Size", and "Use". These information items are generated by the CPU 101 by analyzing attribute information acquired from the storages 110 and 111 connected to the apparatus, according to a data erase process, described hereinafter with reference to FIG. 5, and are managed in the RAM 103.

"No." 301 is a serial number for identifying a partition simply for management. "Clear-Flag" 302 is a flag that indicates whether or not to execute a full erase in the case of deleting a file in a partition. "Clear-Flag" 302 is set to 0 when indicating that full erase is not required, and is set to 1 when indicating that full erase is to be performed. It should be noted that "full erase" means not only erasing an area for management of a file, but also overwriting a data area used by the file, with a predetermined pattern a plurality of times.

"CLEAR-Logic" 303 indicates a type of clear logic to be used. "CLEAR-Logic" 303 is set to 0 when indicating that no special clear logic is used, and is set to 1 when indicating that the number of times of overwriting and a pattern to be written are determined according to user configuration. Further, "CLEAR-Logic" 303 is set to 2 when indicating that a data erase is performed by overwriting with 0 only once. Furthermore, "CLEAR-Logic" 303 is set to 3 when indicating that a data erase is performed by issuing an erase sector command. A value of 3 as "CLEAR-Logic" is limited to only when a device to which the partition belongs supports the erase sector command.

"Label" 304 is a character string representing a name for identifying a partition. "Major No." 305 is a number for identifying a major number which is associated with a storage device containing the partition, in a storage device file. "Minor No." 306 is a number for identifying a minor number which is associated with the partition, in the storage device file. It should be noted the term "storage device file" is intended to mean a logical file that provides access to a storage device and is offered as a function of the operating system. These identifying numbers are stored in the storage area configuration information table 300 by the CPU 101 acquiring information on the nonvolatile storage devices 110 and 111 connected to the image forming apparatus 100 at the start of the apparatus. When a partition exists in a storage device, a block number as an identification number indicative of the partition in a management table which is created and stored in a file system area of the storage device for management of partitions thereof is stored as "Minor No." in the storage area configuration information table 300.

"Size" 307 is the size of the partition in units of megabytes. "Use" 308 is auxiliary information indicating what kind of information is stored in the partition. If a file descriptor of a user data file is identified by referring to the storage area configuration information table (partition management table) 300, it is possible to identify an area where the file exists and what type of clear logic is to be used for deletion of the area.

The configuration of the image forming apparatus according to the first embodiment and the storage area configuration of the nonvolatile storage device are described as above. In the following, the features of the present invention will be described in more detail.

Figure 4:
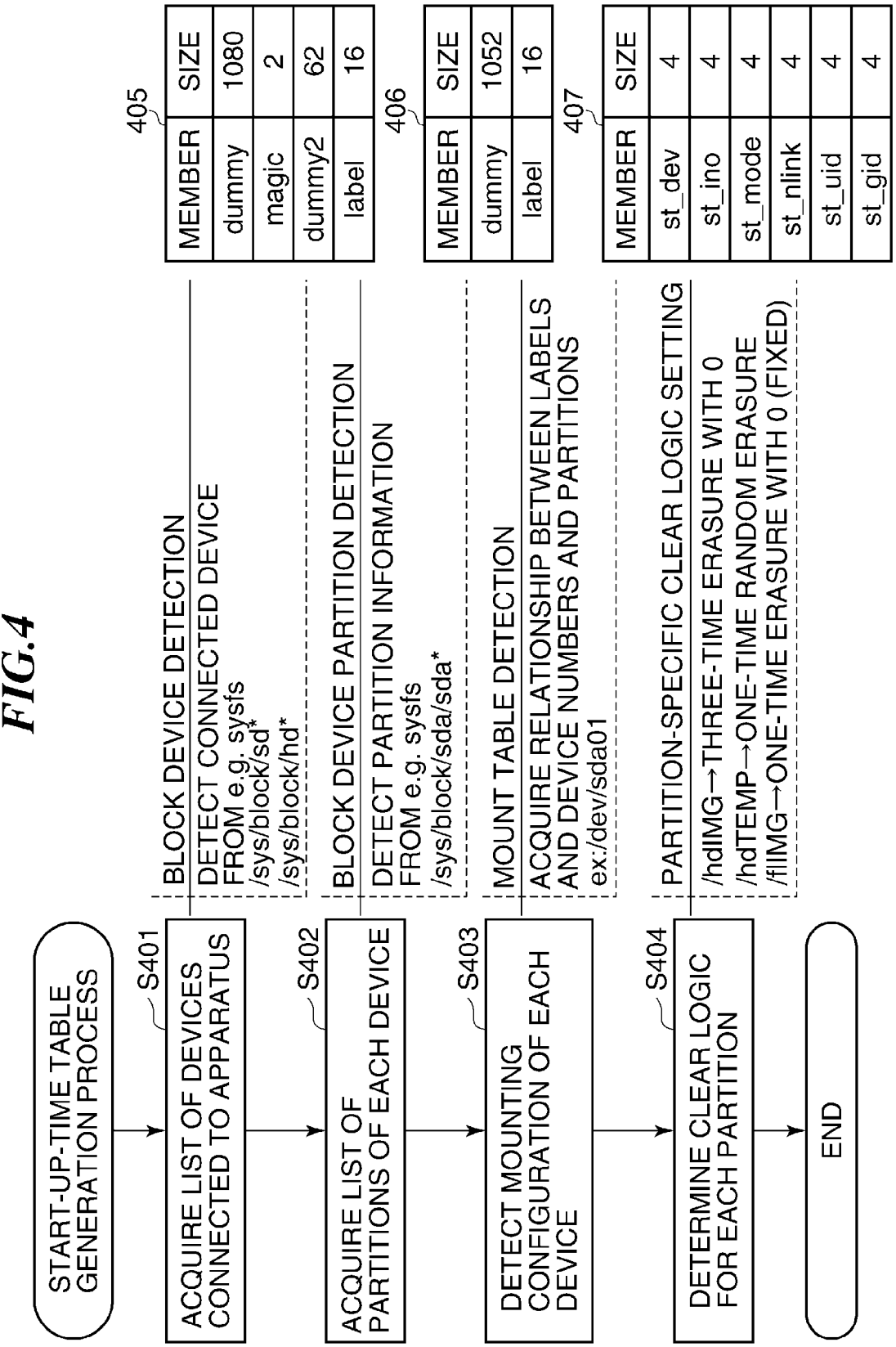
FIG. 4 is a flowchart of a start-up-time table generation process executed by the image forming apparatus.

FIG. 4 is a flowchart of a start-up-timetable generation process executed by the image forming apparatus. The present example shows a generation process for generating the storage area configuration information table 300 illustrated in FIG. 3. Each step of the start-up-time table generation process is realized by the CPU 101 loading an associated control program stored in the ROM 102, the storage 110, or the like into the RAM 103 and executing the same.

In a step S401, the CPU 101 acquires a list of devices connected to the apparatus. For example, when the OS (Operating System) of the image forming apparatus is Linux (registered trademark), it is possible to acquire the list of devices by detecting folders under "/sys/block".

Then, in a step S402, the CPU 101 acquires a list of partitions of each device. For example, when the OS is Linux (registered trademark), the list of partitions can be acquired by detecting files corresponding to respective partitions under each of the folders corresponding to the respective devices, such as "/sys/block/sda", which is detected in the step S401.

Then, in a step S403, the CPU 101 detects mounting configuration of each device. The CPU 101 checks the labels of the respective partitions acquired in the step S402 to thereby achieve the detection of the mounting configuration. For example, assuming the OS is Linux, if ext3 (a type of Linux file system) is used, it is possible to acquire labels in a table 405 as illustrated in FIG. 4. Further, if swap (a type of Linux file system) is used, it is possible to acquire labels in a table 406 illustrated in FIG. 4.

Further, by acquiring stat (detailed information on the file system) of the mount position of a partition having the same name as that of a label, it is possible to acquire the major number and the minor number of a device in which the partition is disposed, according to a table 407 illustrated in FIG. 4. Based on the information, "Major No." 305 and "Minor No." 306, mentioned above, are determined. Finally, in a step S404, the CPU 101 reads out erase settings configured by the user, and determines clear logic and parameters associated with aforementioned "CLEAR-Logic" 303, followed by terminating the table generation process. In the present embodiment, the storage area configuration information table (partition management table) 300 illustrated in FIG. 3 is thus generated at the start of the system, and erasure of user data is set up. It should be noted that the storage area configuration information table 300 is managed in the program area of the storage 110.

Figure 5:
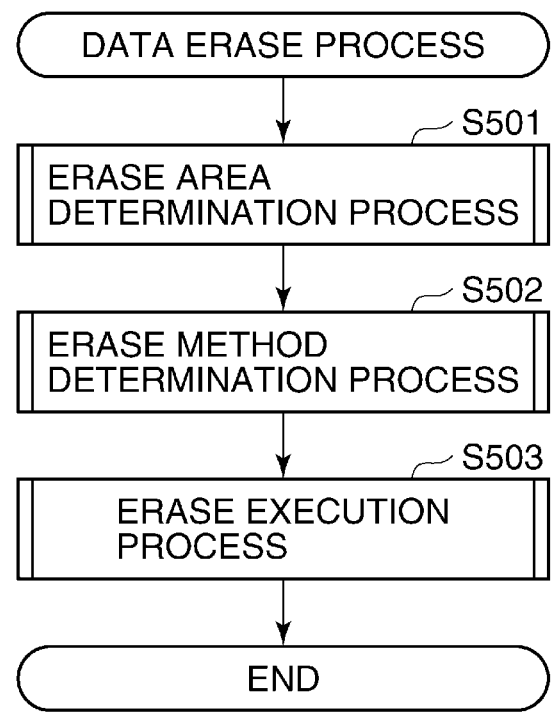
FIG. 5 is a flowchart of a data erase process executed by the image forming apparatus.

FIG. 5 is a flowchart of a data erase process executed by the image forming apparatus of the present embodiment. Steps of the data erase process are realized by the CPU 101 loading an associated control program stored in the ROM 102, the storage 110, or the like into the RAM 103 and executing the control program.

First, in a step S501, the CPU 101 executes an erase area determination process which is executed by acquiring a device number (Major No.) from a file to be erased. For example, when the OS is Linux, stat (a system call in Linux) is performed on the descriptor of the file to be erased, whereby the device number can be acquired.

Next, in a step S502, the CPU 101 executes an erase method determination process for identifying a clear logic corresponding to the device number in the storage area configuration information table (partition management table) 300. Then, in a step S503, the CPU 101 executes an erase execution process to actually erase the designated file, followed by terminating the data erase process.

Figure 6:
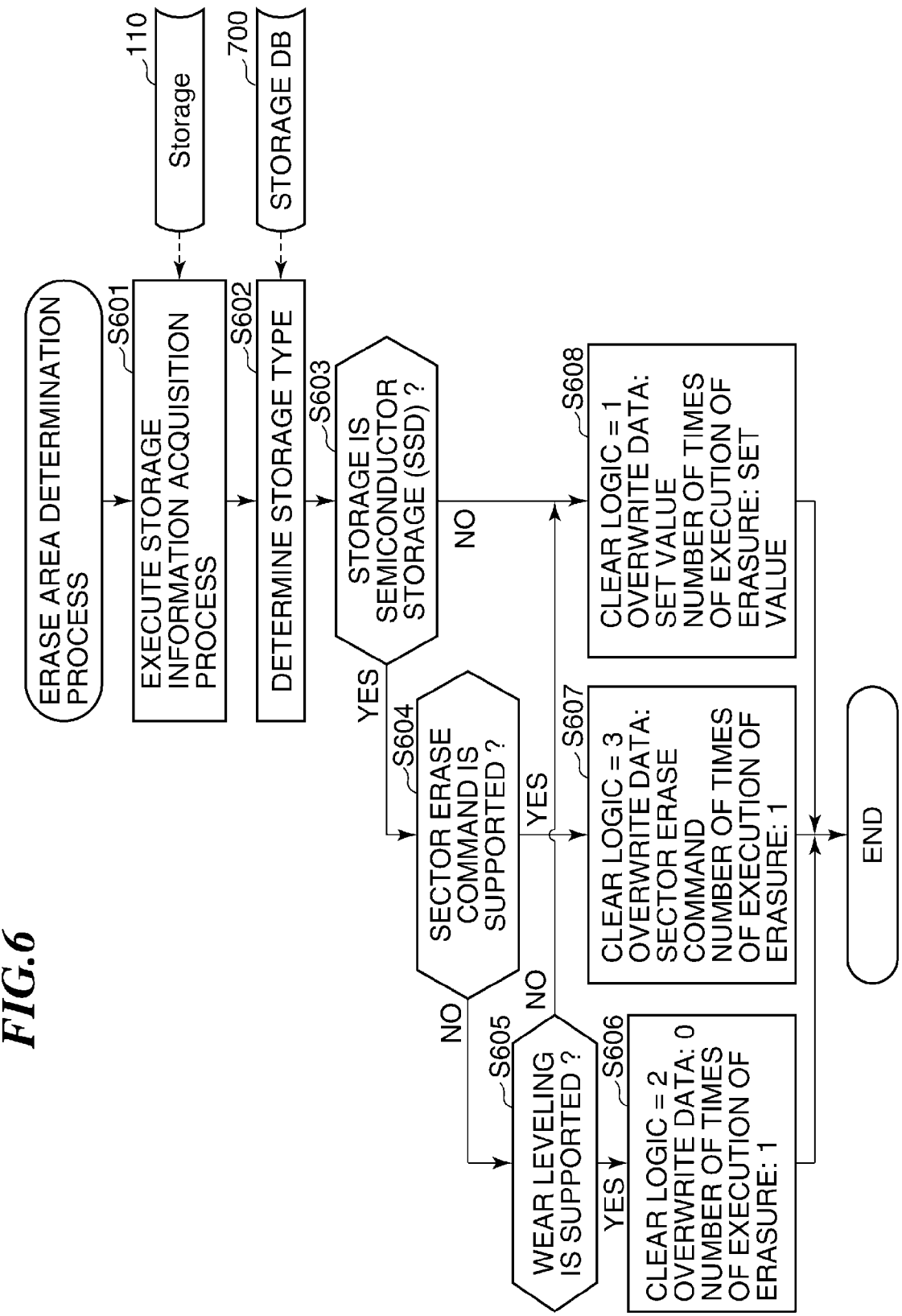
FIG. 6 is a flowchart of an erase area determination process executed by the image forming apparatus.

FIG. 6 is a flowchart of the erase area determination process executed in the step S501 of the data erase process in FIG. 5. The present process is executed between the process executed in the step S401 in FIG. 4, for acquisition of the list of the devices connected to the apparatus, and the process executed in the step S402, for acquisition of the partition list of each of the devices. Steps of the erase area determination process are realized by the CPU 101 loading an associated control program stored in the ROM 102, the storage 110, or the like into the RAM 103 and executing the same.

First, in a step S601, the CPU 101 executes a storage information acquisition process to acquire storage information including a manufacturer name and a model number from the storage 110 connected to the image forming apparatus 100. In this case, the CPU 101 can acquire the storage information by sending a command to the storage 110 via the disk controller 109. However, this process is not a characterizing feature of the present invention, and therefore detailed description thereof is omitted. It should be noted that when the OS is Linux, the storage information can be acquired by issuing a system call ioctl for calling an OS function so as to acquire file description information, to a device file. In the following, a description will be given, with reference to FIG. 7, of storage information items extracted from the acquired storage information, which are necessary for processing in the present embodiment.

FIG. 7 is a diagram useful in explaining component elements of a storage information table 700 of the image forming apparatus as the information processing apparatus according to the present embodiment.

Referring to FIG. 7, "Storage No." 701 denotes identification numbers for identifying the storage 110 and the storage 111 which are connected to the image forming apparatus 100, respectively. "Storage No." has the same meaning as "device number" and "Major No." in FIG. 3. As "Manufacturer Name" 702, there is stored a character string representing the name of a manufacturer of a nonvolatile storage device connected to the image forming apparatus 100. As "Model Number" 703, there is stored a character string representing the model number of the nonvolatile storage device. By using the character strings stored as "Manufacturer Name" 702 and "Model Number" 703, it is possible to check the nonvolatile storage device against a storage database (DB) 800, referred to hereinafter.

As "Support Command" 704, there is recorded information on commands supported by the nonvolatile storage device connected to the image forming apparatus 100. The acquired storage information items are stored in the RAM 103, as the storage information table 700 illustrated in FIG. 7, for use in determination of a storage type and selection of an erase method, which are performed later. In the present embodiment, since "Support Command" 704 is acquired as command information included in attribute information, the CPU 101 can determine whether the storage 110 and the storage 111 connected to the image forming apparatus 100 support a predetermined erase command. In the present embodiment, a sector erase command in FIG. 7 is exemplified as the predetermined erase command.

Referring again to the FIG. 6 flowchart, the CPU 101 determines a storage type in a step S602 by checking the storage information acquired by the storage information acquisition process in the step S601 against the storage database (DB) 800. Now, the storage database 800 will be described in detail with reference to FIG. 8.

FIG. 8 is a diagram useful in explaining component elements of the storage database 800 stored in the image forming apparatus The storage database 800 is held and managed in a program area of the storage 110.

Referring to FIG. 8, "ID" 801 denotes a number for identifying an entry of the database. As "Manufacturer Name" 702, there is stored a character string representing the name of a manufacturer of a nonvolatile storage device as the entry. As "Model Number" 703, there is stored a character string representing a model number associated with the nonvolatile storage device as the entry. As "Medium Type" 804, there is stored a character string representing the type of a storage medium corresponding to the nonvolatile storage device recorded in the entry, and whether the storage medium is a magnetic HDD or a semiconductor disk is stored by the character string (Semiconductor Disk or Magnetic Hard Disk).

As "Wear Leveling Area Information" 805, there is recorded information indicative of whether a wear leveling area exists in the nonvolatile storage device as the entry. Further, if a wear leveling area exists, information indicative of whether the wear leveling area covers an entire area of the nonvolatile storage device or a specific area of the same is recorded. For example, "All" recorded as "Wear Leveling Area Information" 805 indicates that wear leveling control is performed on the entire area of the nonvolatile storage device. A mark "-" indicates that wear leveling control is not performed. When a specific address range is recorded as "Wear Leveling Area Information" 805, it is indicated that wear leveling control is performed on the logical address range.

The storage database 800 is searched using, as a key, a character string stored as "Model Number" 703. By thus searching the storage database 800, it is possible to acquire detailed type information on the storages 110 and 111 connected to the image forming apparatus 100.

Referring again to the FIG. 6 flowchart, in a step S603, the CPU 101 determines from the storage type of the storage 110 which is determined by the storage characteristic determination in the step S602, particularly from "Medium Type" 804 of the storage database 800, whether or not the storage 110 is a semiconductor storage type. In the step S603, the CPU 101 determines whether or not the nonvolatile storage device connected to the image forming apparatus 100 is a semiconductor storage device or a nonvolatile storage device different from a semiconductor storage device. Particularly when an unknown storage model is connected, i.e. when a detected device does not match any model in the storage database 800, the CPU 101 further acquires rotation characteristics of the storage.

The speed of rotation indicates the rpm speed of a medium of a storage device. A hard disk drive outputs a rotational speed, whereas a device, such as a solid-state drive, which involves no rotation, returns 0 or 1. The rotational speed is defined by the known ATA8-ACS standard.

If it is determined in the step S603, e.g. based on "Medium Type" 804 of the storage database 800, that the nonvolatile storage device is not a semiconductor storage, the process proceeds to a step S608. In the step S608, the CPU 101 sets "CLEAR-Logic" 303 to 1 in which both overwrite data and the number of times of execution of erasure are determined according to user configuration, followed by terminating the present process.

On the other hand, if the CPU 101 determines in the step S603 that the storage 110 is a semiconductor storage, the process proceeds to a step S604. In the step S604, the CPU 101 refers to "Support Command"704 of the storage information table 700 acquired by the storage information acquisition process described hereinbefore, and determines whether or not the sector erase command is supported. It should be noted that whether or not the sector erase command is supported may be determined using the storage database 800.

If the CPU 101 determines in the step S604 that the semiconductor storage supports the sector erase command, the process proceeds to a step S607. In the step S607, the CPU 101 sets "CLEAR-Logic" 303 to 3 in which the overwrite data is substituted by the sector erase command and the number of times of execution of erasure is set to "once", followed by terminating the present process.

On the other hand, if the CPU 101 determines in the step S604 that the semiconductor storage does not support the sector erase command, the process proceeds to a step S605. In the step S605, the CPU 101 determines, based on "Wear Leveling Area Information" 805 of the storage database 800, whether or not wear leveling is supported. If the CPU 101 determines in the step S605 that wear leveling is not supported, the process proceeds to the step S608. In the step S608, the CPU 101 sets "CLEAR-Logic" 303 to 1 as mentioned above, followed by terminating the present process.

On the other hand, if the CPU 101 determines in the step S605 that the semiconductor storage supports wear leveling, the process proceeds to a step S606. In the step S606, the CPU 101 sets "CLEAR-Logic" 303 to 2 in which the overwrite data is set to 0 and the number of times of execution of erasure is set to 1, followed by terminating the present process.

By executing the above-described erase area determination process, it is possible to finely determine the storage type of a nonvolatile storage device, securely erase user data, and determine an efficient clear logic.

Figure 9:
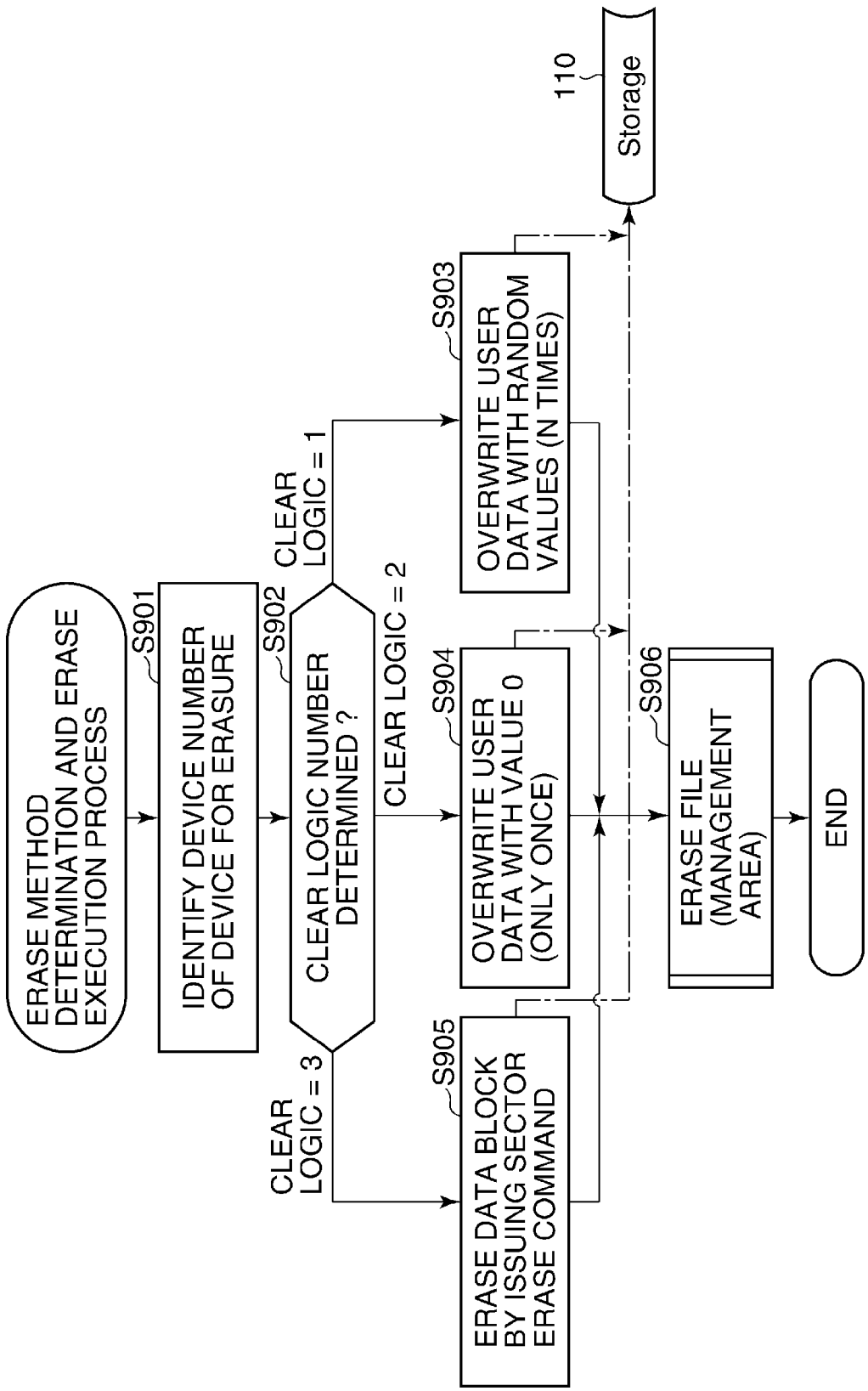
FIG. 9 is a flowchart of an erase method determination and erase execution process executed by the image forming apparatus.

FIG. 9 is a flowchart of the erase method determination and erase execution process executed in the steps S502 and S503 of the data erase process in FIG. 5. Steps of the erase method determination and erase execution process are realized by the CPU 101 loading associated control programs stored e.g. in the ROM 102 into the RAM 103 and executing the programs. It is assumed that a table for determining a clear logic (erase method) has already been generated by the clear logic table generation process described hereinbefore with reference to FIG. 4.

In a step S901, when the CPU 101 determines that an erase instruction for erasing a file has been received via a user interface, not shown, the CPU 101 identifies a device number to determine a device to which the file designated for erasure belongs. In general, when the OS is Linux, the CPU 101 can identify a device number by acquiring stat information of a file descriptor.

Then, in a step S902, the CPU 101 refers to the storage area configuration information table 300 for determining the clear logic (see FIG. 3) to search for a line in the table 300 in which identifying numbers 305 and 306 associated with the device number identified in the step S901 are written, and determine "Clear-Flag" 302 that indicates whether or not to execute full erase and "CLEAR-Logic" 303, which are written in the line. If the CPU 101 determines according to "Clear-Flag" 302 that the file to be erased is data which needs full erase, and in other words is in a user data area, processing is branched according to the value of "CLEAR-Logic" 303. It should be noted that the full erase is processing for overwriting a data area used by a file, with a predetermined pattern a plurality of times, and corresponds to values of 1 to 3 of "Clear Logic" 303, and hence in the process in FIG. 9, a branch corresponding to the case of "Clear Logic"=0 is omitted, i.e. not shown in FIG. 9.

For example, if the CPU 101 determines that the value of "Clear-Logic" 303 is 1, the process proceeds to a step S903. In the step S903, the CPU 101 overwrites the data area with random values N times to erase the data in the area, in fear of the fact that magnetic values can be left unless writing is performed a plurality of times. Then, the process proceeds to a step S906.

If the CPU 101 determines in the step S902 that the value of "Clear-Logic" 303 is 2, the process proceeds to a step S904. In the step S904, with a view to preventing wasteful wear of the semiconductor storage by wear leveling, the CPU 101 erases the data area only once by overwriting the data area with 0. Then, the process proceeds to the step S906.

If the CPU 101 determines in the step S902 that the value of "Clear-Logic" 303 is 3, the process proceeds to a step S905. In the step S905, the CPU 101 determines that the semiconductor storage supports the sector erase command for secure erasure of a sector area which is a minimum unit of area of a storage device for write and read, and issues the sector erase command to erase the data area. Then, the process proceeds to the step S906.

After overwrite erasure has been performed on the data area of the file by one of the above-described erase methods, the CPU 101 erases the presence of the file on the management area in the step S906, followed by terminating the present process. Thus, it is possible to finely determine the storage type of the nonvolatile storage device connected to the image forming apparatus 100, securely erase user data, and determine an efficient clear logic.

In the above-described first embodiment, the description is given of a case where when it is determined that a nonvolatile storage device is of a semiconductor storage type, it is further determined whether or not the semiconductor storage device supports a predetermined command, to thereby determine a clear logic for erasing information stored in the semiconductor storage device, and then the stored information is erased. In the following, a second embodiment of the present invention will be described in which it is determined whether information to be erased which is stored in a nonvolatile storage device is user information or other information, and then it is determined whether or not the nonvolatile storage device is of a semiconductor storage type, to thereby determine a clear logic for erasing the stored information. It should be noted that hardware configuration of the second embodiment is identical to that of the first embodiment, and therefore description thereof is omitted.

FIG. 10 is a diagram illustrating a storage area configuration information table (partition table) formed on associated with the storage 110 appearing in FIG. 1.

As shown in FIG. 10, in the second embodiment, the storage area configuration information table 1000 comprises items 1001 to 1007: "No.", "Label", "Storage No.", "Start Block Address", "End Block Address", "Size", and "Exist User Data".

"No." 1001 is a number for identifying a partition. "Label" 1002 is a character string for identifying the partition by name. "Storage No." 1003 is a number for identifying a storage where the partition exists. When the partition exists in the storage 110, a value of 1 is stored as "Storage No." 1003. When the partition exists in the storage 111, a value of 2 is stored as "Storage No." 1003.

"Start Block Address" 1004 is a start address of an area where the partition exists in the form of a logical block address in hexadecimal format. "End Block Address" 1005 is an end address of the area where the partition exists in the form of a logical block address in hexadecimal format.

"Size" 1006 is the size of the partition in the form of the number of blocks in hexadecimal format. "Exist User Data" 1007 is auxiliary information indicative of whether or not the partition can store user data. The disk controller 109 refers to the storage area configuration information table (partition table) 1300 to thereby identify an area where user data can exist and a range of logical blocks of the area.

Figure 11:
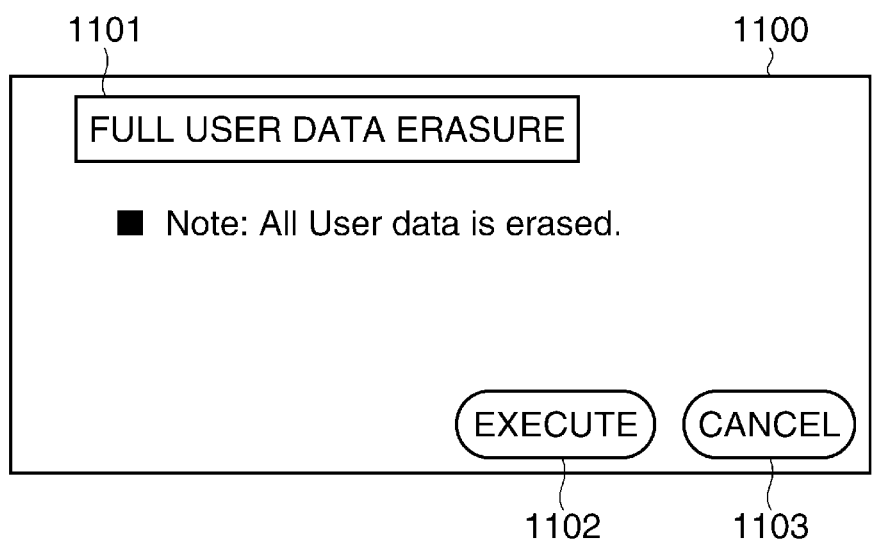
FIG. 11 is a view illustrating an example of a user interface displayed on a panel appearing in FIG. 1.

FIG. 11 is a view illustrating an example of a user interface displayed on the display section (PANEL) 106 appearing in FIG. 1. The displayed user interface is a screen via which it is confirmed whether user data is to be actually erased.

Referring to FIG. 11, an operation screen 1100 is displayed on the display section (DISPLAY) 108. The user can issue an execution instruction via the operation screen 1100. A title 1101 is a title displayed to indicate that full user data erasure is performed. User data erasure is executed by touching an execute button 1102. The operation screen for full user data erasure can be canceled by touching a cancel button 1103.

In the present embodiment as well, the CPU 101 executes the data erase process shown in FIG. 5 to thereby determine an area to be erased and an erase method, and then actually perform erasure on the determined erase area to erase user data.

Figure 12:
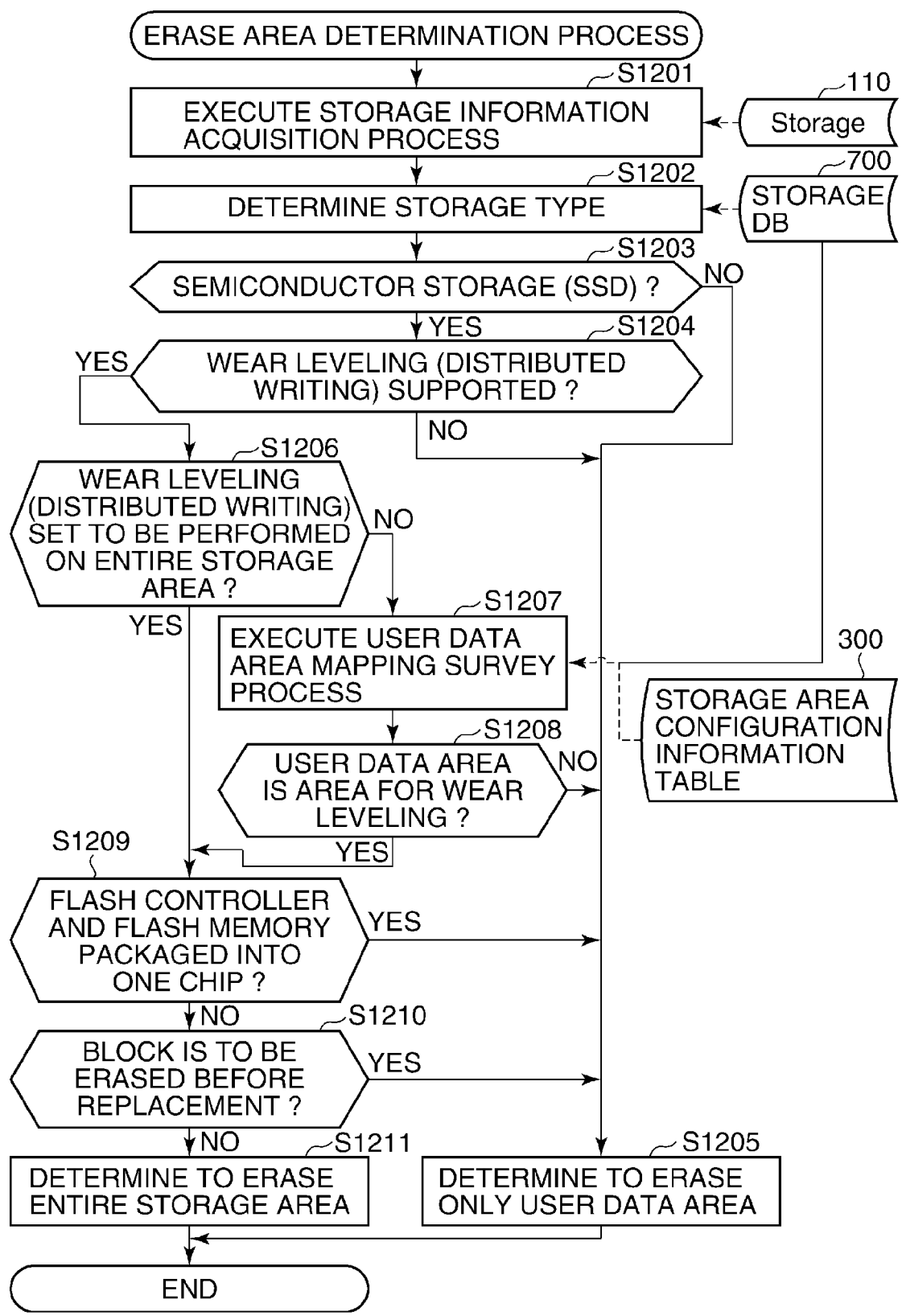
FIG. 12 is a flowchart of an erase area determination process executed by the image forming apparatus.

FIG. 12 is a flowchart of the erase area determination process executed in the step S501 in FIG. 5. It should be noted that steps of the present process are realized by the CPU 101 loading an associated control program stored in the ROM 102, the storage 110, or the like into the RAM 103, and executing the same.

First, in a step S1201, the CPU 101 executes a storage information acquisition process to acquire storage information including a manufacturer name and a model number from the storage 110 connected to the image forming apparatus 100. In this case, the CPU 101 can acquire the storage information by issuing a command to the storage 110 via the disk controller 109. However, this process is not a characterizing feature of the present invention, and therefore detailed description thereof is omitted.

In the following, a description will be given, with reference to FIG. 13, of storage information items extracted from the storage information acquired from the storage 110, which are necessary for processing in the present embodiment. FIG. 13 is a diagram useful in explaining component elements of a storage information table 1000 held in the RAM 103 appearing in FIG. 1.

Referring to FIG. 13, "Storage No." 1301 is an identifying number for identifying the storage 110 or the storage 111 connected to the image forming apparatus 100. As "Manufacturer Name"1302, there is stored a character string representing the name of a manufacturer of a nonvolatile storage device connected to the image forming apparatus 100. As "Model Number"1303, there is stored a character string representing the model number of the nonvolatile storage device. By using the character strings stored as "Manufacturer Name"1302 and "Model Number"1303, it is possible to check the nonvolatile storage device against a storage database described hereinafter.

As "Support Command" 1304, there is recorded command information supported by the nonvolatile storage device connected to the image forming apparatus 100. The storage information thus acquired from the storage 110 is stored in the storage information table 1000 illustrated in FIG. 13, for use in storage type determination and erase method selection which are executed afterwards.

Referring again to the erase area determination process in FIG. 12, in a step S1202, the CPU 101 checks the storage information acquired by the storage information acquisition process in the step S1201 against the storage database (storage DB) 1700 illustrated in FIG. 14 by way of example. Thus, the CPU 101 determines a storage type.

FIG. 14 is a diagram useful in explaining component elements of the storage DB 1400 held in the RAM 103 appearing in FIG. 1. The storage DB 1400 is stored and managed in the program area of the storage 110.

Referring to FIG. 14, "ID" 1401 is a number for identifying an entry of the database. As "Manufacturer Name" 1402, there is stored a character string representing the name of a manufacturer of a nonvolatile storage device in the entry. As "Model Number" 1403, there is stored a character string representing a model number of the nonvolatile storage device in the entry. As "Medium Type" 1404, there is stored a character string representing a type of storage medium corresponding to the nonvolatile storage device in the entry, and whether the storage medium is a magnetic HDD or a semiconductor disk is stored by the character string.

As "Wear Leveling Area Information" 1405, there is recorded information indicative of whether a wear leveling area exists in the nonvolatile storage device as the entry. Further, if a wear leveling area exists, information indicative of whether the wear leveling area covers an entire area of the nonvolatile storage device or a specific area of the same is recorded. For example, "All" recorded as "Wear Leveling Area Information" 805 indicates that wear leveling control is set to be performed on the entire area of the nonvolatile storage device. A mark "-" indicates that wear leveling control is not set to be performed. When a specific address range is recorded as "Wear Leveling Area Information" 1405, it is indicated that wear leveling control is set to be performed on the logical address range.

As "Wear Leveling Pre-replacement Block Erase" 1406, there is recorded information indicative of whether or not, when a write destination physical block is changed by wear leveling control, erasure is to be performed on a former physical block yet to be replaced. When "Yes" is recorded, control is performed such that erasure is performed on the former physical block before block replacement, and then the former physical block is replaced by a new physical block. On the other hand, when "No" is recorded, control is performed such that the former physical block is only entered as an available or unused block without being subjected to erasure, and is replaced by a new physical block.

As "Package Type" 1407, there is recorded information indicative of whether or not a storage determined as a semiconductor storage has a controller and a flash memory integrally combined with each other (i.e. packaged into one chip). When "One Chip" is recorded, the semiconductor storage has a controller and a flash memory packaged into one chip. On the other hand, when "Separate" is recorded, the semiconductor storage has a controller and a flash memory separate from each other.

The CPU 101 searches the thus configured storage DB 1400 using, as a key, a character string stored as "Manufacturer Name"1302 or a character string stored as "Model Number"1303 in the above-mentioned storage information. By searching the storage DB 1400 as described above, it is possible to acquire detailed type information of the storage 110 or 111 connected to the image forming apparatus 100.

Referring again to the FIG. 12 erase area determination process, in a step S1203, the CPU 101 determines, based on the "Medium Type" 1404 of the storage DB 1400, whether or not the storage type of the storage 110 determined by the storage characteristic determination in the step S1202 is the semiconductor storage type. If the CPU 101 determines that the storage 110 is not a semiconductor storage, i.e. if the storage 110 is a magnetic HDD, there is no concern that distributed writing by wear leveling changes logical blocks and physical blocks whenever writing is performed. Therefore, the process proceeds to a step S1205, and the CPU 101 determines that only a user data area is to be erased, followed by terminating the present process.

On the other hand, if it is determined in the step S1203 that the storage 110 is a semiconductor storage, the CPU 101 determines in a step S1204 whether or not the semiconductor storage is one subjected to wear leveling, based on "Wear Leveling Area Information" 1405 of the storage database. It should be noted that not all semiconductor storages are subjected to wear leveling. If the CPU 101 determines in the step S1204 that the semiconductor storage is not subjected to wear leveling, the process proceeds to the step S1205. In the step S1205, since the semiconductor storage can be handled in the same way as a magnetic HDD is, the CPU 101 determines that only the user data area is to be erased, followed by terminating the present process.

If the CPU 101 determines in the step S1204 that the semiconductor storage is one subjected to wear leveling, the process proceeds to a step S1206. In the step S1206, the CPU 101 determines, based on "Wear Leveling Area Information" 1405 of the storage database, whether or not wear leveling is set to be performed on the entire storage area thereof. It should be noted that a semiconductor storage in which wear leveling is performed only on a partial area thereof can be handled in the same way as a magnetic HDD is, unless an area likely to store user data is the area for wear leveling.

If the CPU 101 determines in the step S1206 that wear leveling is not set to be performed on the entire storage area, the process proceeds to a step S1207. In the step S1207, the CPU 101 compares between the storage area configuration information table 1000 (see FIG. 10) and "Wear Leveling Area Information" 1405 of the storage DB 1400 to execute a user data area mapping survey process.

It should be noted that the survey is performed by acquiring an address range from "Start Block Address" 1004 to "End Block Address" 1005 associated with each of all areas for which "Exist User Data" 1007 of the storage area configuration information table 1000 is set to "Yes".

In a step S1208, the CPU 101 determines, based on the result of the user data area mapping survey process, whether or not the user data area is an area for wear leveling. Specifically, this determination is performed by determining whether or not the address range where the user data can exist, acquired as described above by the CPU 101, overlaps an address range recorded as "Wear Leveling Area Information" 1405.

If the CPU 101 determines that the user data area is not an area for wear leveling, user data exists only in areas on which wear leveling is not performed, and in this case, the semiconductor storage can be handled in the same way as a magnetic HDD is. Therefore, the process proceeds to the step S1205, and the CPU 101 determines that only the user data area is to be erased, followed by terminating the present process.

On the other hand, if the CPU 101 determines in the step S1206 that wear leveling is set to be performed on the entire storage area of the semiconductor storage, the process proceeds to a step S1209. Similarly, if the CPU 101 determines in the step S1208 that the user data area is an area for wear leveling, the process proceeds to the step S1209.

In the step S1209, the CPU 101 determines, based on "Package Type" 1407 of the storage database, whether or not the semiconductor storage has a flash controller and a flash memory packaged into one chip. When the CPU 101 determines that the flash controller and the flash memory configured to perform wear leveling control are packaged in the same chip, even if data is left in a former block used before physical block replacement for wear leveling, the data cannot be read out. This is because the former block used before the block replacement is allocated to an available or unused block after the block replacement, which makes it impossible to read out the physical block used before the block replacement, via the flash controller.

On the other hand, when the flash controller and the flash memory are formed by respective different chips, there is a danger that only the flash memory chip is removed from a substrate so as to read the former physical block used before the block replacement. This point will be described in detail with reference to FIGS. 15A and 15B.

Figure 15A:
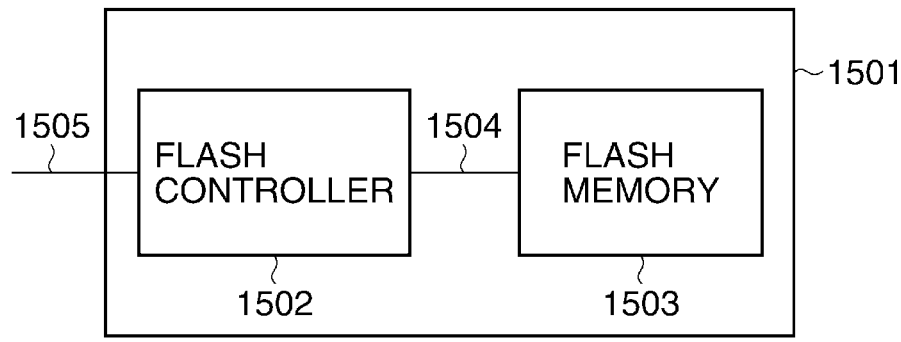
FIGS. 15A and 15B are block diagrams each illustrating a chip configuration of a semiconductor storage in the image forming apparatus.
Figure 15B:
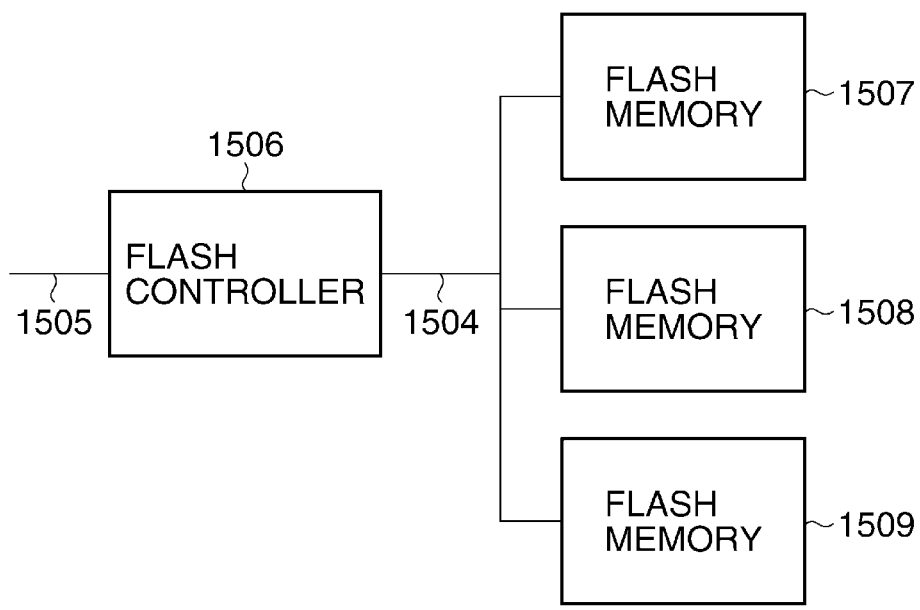

FIGS. 15A and 15B are block diagrams useful in explaining the chip configuration of the semiconductor storage which can be used in the image forming apparatus of the present embodiment. FIG. 15A illustrates an example in which a flash controller 1502 and a flash memory 1503 are packaged in the same chip. The flash controller 1502 and the flash memory 1503 both exist in one chip 1501 and are connected to each other via a bus 1504. In the illustrated example, a write/read command and data are exchanged with the chip via an interface 1505.

In such a semiconductor storage as constructed as above, a flash memory within a chip is under the complete control of a flash controller, and the flash controller does not allow an unused area to be read. For this reason, data in a physical block allocated to an available or unused area cannot be read out.

On the other hand, FIG. 15B illustrates an example in which a flash controller and a flash memory are formed by respective different chips. A flash controller 1506 is connected, via the bus 1504, to flash memory chips containing respective flash memories 1507, 1508, and 1509, and a write/read command and data are exchanged with the chips via the interface 1505.

In a semiconductor storage of the type illustrated in FIG. 15B, in which a flash controller and flash memories are not packaged into one chip, each flash memory chip is independent of the flash controller 1506, so that it is possible to remove only a flash memory chip. For this reason, there is a danger that the removed flash memory is mounted in another flash controller and a former physical block used before block replacement is read.

Referring again to the FIG. 12 erase area determination process, if it is determined in the step S1209 that the semiconductor storage is formed as one chip as described with reference to FIG. 15A, the CPU 101 determines that there is no fear of user data being read, and the process proceeds to the step S1205. In the step S1205, the CPU 101 determines that only the user data area is to be erased, followed by terminating the present process.

On the other hand, if the CPU 101 determines in the step S1209 that the semiconductor storage is not of the one-chip type, the process proceeds to a step S1210. In the step S1210, the CPU 101 determines whether or not block replacement by wear leveling control is performed after erasure of the former physical block used before block replacement. Specifically, the CPU 101 determines, based on "Wear Leveling Pre-replacement Block Erase" 1406 of the storage database, whether or not block replacement is performed after erasure of the former physical block. If the CPU 101 determines that a new physical block is allocated after erasure of the former physical block (YES to the step S1210), the process proceeds to the step S1205. In the step S1205, since user data is erased from the former physical block used before replacement, the CPU 101 determines that only the user data area is to be erased, followed by terminating the present process.

On the other hand, if the CPU 101 determines in the step S1210 that a new physical block is allocated without erasing the former physical block used before replacement, the process proceeds to a step S1211. In this case, there is a danger that only the flash memory chip is removed from the substrate so as to read the former physical block used before the block replacement. Therefore, the CPU 101 determines in the step S1211 that the entire storage area of the semiconductor storage is to be erased, followed by terminating the present process. This point will be described with reference to FIGS. 16A and 16B.

FIGS. 16A and 16B are diagrams useful in explaining the two types of wear leveling control in the image forming apparatus as the information processing apparatus according to the present embodiment. FIG. 16A illustrates the flow of wear leveling control of the type in which a former physical block used before block replacement is erased and then writing is performed in a new physical block. First, when wear leveling control occurs in a write process for writing in a physical block space 1600 of a flash memory, the CPU 101 erases a former physical block 1601 used before block replacement (1).

Then, the CPU 101 allocates the former physical block 1601 to an available or unused block (2) and performs writing in a new physical block 1602 (3). In a case where block replacement is performed by wear leveling control in the process described above, a former physical block is erased through erasure of user data by overwriting, so that security can be maintained even if wear leveling works.

FIG. 16B illustrates the flow of wear leveling control of the type in which a new physical block is allocated without erasure of a former physical block used before block replacement. When wear leveling control occurs in a write process for writing in the physical block space 1600 of the flash memory, the CPU 101 simply allocates the former physical block 1601 used before block replacement to an available or unused block (1). Then, the CPU 101 performs writing in the new physical block 1602 (2).

In the case illustrated in FIG. 16B, when user data is erased by overwriting, wear leveling works to leave the user data in the former physical block 1601 having been allocated to the unused block. In general, the flash controller performs control such that reading of the unused block is inhibited, and therefore no problem occurs. However, when a flash memory chip is provided independently as described hereinbefore, there is a fear that the chip is removed and the physical block with the user data left therein is read. For this reason, in a semiconductor storage in which a flash memory chip is provided independently and a former physical block is not erased when block replacement is performed by wear leveling, it is determined that the entire storage area is to be erased.

By executing the FIG. 12 erase area determination process as described above, it is possible to finely determine the storage type of the nonvolatile storage device and securely erase user data, and determine an efficient erase range.

Next, a description will be given, with reference to FIG. 17, of a process for determining an erase method and executing erasure. FIG. 17 is a flowchart of the erase method determination and erase execution process executed in the steps S502 and S503 in FIG. 5. Steps of the present process are realized by the CPU 101 loading an associated control program stored e.g. in the ROM 102 into the RAM 103 and executing the same.

First, in a step S1701, the CPU 101 determines, based on the result of determination by the erase area determination process described hereinbefore with reference to FIG. 12, whether or not only the user data area is to be erased. If the CPU 101 determines that only the user data area is to be erased, the process proceeds to a step S1702. In the step S1702, the CPU 101 determines whether or not the target for erasure is an area of a semiconductor storage.

If the CPU 101 determines that the target for erasure is an area of a semiconductor storage, the user data can be securely erased by only one-time erasure of the user data area. Therefore, in a step S1704, the CPU 101 erases the data by executing one-time writing in the user data area of the storage 110, followed by terminating the present process.

On the other hand, if the CPU 101 determines in the step S1702 that the target for erasure is not an area of a semiconductor storage, the storage is a magnetic HDD, and hence there is a fear that magnetic values can be left unless data writing is performed a plurality of times. Therefore, in a step S1703, the CPU 101 performs overwrite data erasure on the user data area of the storage 110 a plurality of times, followed by terminating the present process.

If the CPU 101 determines in the step S1701 that not only the user data area is to be erased, the process proceeds to a step S1705. In the step S1705, the CPU 101 determines whether or not a security unit erase command for secure erasure of the entire area is supported. It should be noted that some storage devices support the security unit erase command, and in particular, semiconductor storages generally support the security unit erase command.

Whether or not the security unit erase command is supported can be determined by referring to "Support Command" 1304 of the storage information table 1000 (see FIG. 13) acquired by the storage information acquisition process in the step S1201 of the erase area determination process described hereinbefore with reference to FIG. 12. If the CPU 101 determines in the step S1705 that the nonvolatile storage device supports the security unit erase command for secure erasure of the entire area of the storage device, the process proceeds to a step S1706. In the step S1706, the CPU 101 issues the security unit erase command to the storage 110 to thereby erase all the blocks, followed by terminating the present process.

On the other hand, if the CPU 101 determines in the step S1705 that the storage 110 is a nonvolatile storage device that does not support the security unit erase command for secure erasure of the entire area, the process proceeds to a step S1707. In the step S1707, the CPU 101 performs writing on all the blocks of the storage 110 a plurality of times, followed by terminating the present process. It should be noted that in the present process, it is required to repeatedly perform the write processing by wear leveling control a considerable number of times until writing is performed on all the physical blocks.

When the storage 110 is a semiconductor storage that does not support the security unit erase command for secure erasure of all the areas and hence it is required to perform erasure on all the areas a considerable number of times, it takes a considerable amount of time. Therefore, a message saying that it will take a long time may be displayed on the display section (DISPLAY) 108, or the user may be allowed to designate the number of times of overwriting.

By executing the erase method determination and erase execution process, it is possible to finely determine the storage type of the nonvolatile storage device connected to the image forming apparatus 100 and securely erase user data, and determine an efficient erase range.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-069414 filed Mar. 25, 2010, which is hereby incorporated by reference herein in its entirety.

What is claimed is:

1. An information processing apparatus to which different types of nonvolatile storage devices can be connected, comprising:
    a determination unit configured to determine an erase method of erasing an erase area of the nonvolatile storage device according to attribute information indicating a type of the nonvolatile storage device; and
    an erasure unit configured to erase information stored in the erase area according to the erase method determined by said determination unit,
    wherein the attribute information includes information indicative of whether or not the nonvolatile storage device is a semiconductor storage device, and includes information indicative of whether or not the semiconductor storage device supports a predetermined erase command.

2. An information processing apparatus according to claim 1, wherein the stored information includes user information, log information, and image information.

3. An information processing apparatus according to claim 1, wherein when the nonvolatile storage device is a semiconductor storage device and the semiconductor storage device supports the predetermined erase command, said erase unit erases the information stored in the erase area according to the predetermined erase command.

4. An information processing apparatus according to claim 1, wherein when the nonvolatile storage device is a semiconductor storage device and the semiconductor storage device does not support the predetermined erase command, said erase unit erases the stored information by writing data in the erase area.

5. A data processing method executed by an information processing apparatus to which different types of nonvolatile storage devices can be connected, comprising:
    determining an erase method of erasing an erase area of a nonvolatile storage device according to attribute information indicating a type of the nonvolatile storage device; and
    erasing information stored in the erase area according to the determined erase method,
    wherein the attribute information includes information indicative of whether or not the nonvolatile storage device is a semiconductor storage device, and includes information indicative of whether or not the semiconductor storage device supports a predetermined erase command.

6. A non-transitory computer-readable storage medium storing a computer-executable program for causing a computer to execute a data processing method executed by an information processing apparatus to which different types of nonvolatile storage devices can be connected,
    wherein the data processing method comprises:
    determining an erase method of erasing an erase area of a nonvolatile storage device according to attribute information indicating a type of the nonvolatile storage device; and
    erasing information stored in the erase area according to the determined erase method,
    wherong the attribute information includes information indicative of whether or not the nonvolatile storage device is a semiconductor storage device, and includes information indicative of whether or not the semiconductor storage device supports a predetermined erase command.

* * * * *